United States Patent
Kolda (10) Patent No.: US 6,758,380 B1
(45) Date of Patent: Jul. 6, 2004

(54) LOCKING FORK MOUNT FOR A BICYCLE CARRIER

(75) Inventor: Clint D. Kolda, Cottage Grove, WI (US)

(73) Assignee: Graber Products, Inc., Madison, WI (US)

(*) Notice: Subject to any disclaimer, the term of this patent is extended or adjusted under 35 U.S.C. 154(b) by 0 days.

(21) Appl. No.: 10/118,990

(22) Filed: Apr. 9, 2002

(51) Int. Cl.[7] ............................................. B60R 9/048
(52) U.S. Cl. ................... 224/315; 224/324; 224/924; 403/320
(58) Field of Search ............................ 224/924, 315, 224/324, 325, 322, 323, 570; 301/110.5, 124.2; 403/320, 322.4, 374.5, DIG. 4; 70/233, 225

(56) References Cited

U.S. PATENT DOCUMENTS

| | | |
|---|---|---|
| 4,028,915 A | 6/1977 | Stahl |
| 4,114,409 A | 9/1978 | Scire |
| 4,621,873 A | 11/1986 | Weinstein et al. |
| 4,724,692 A | 2/1988 | Turin et al. |
| 4,842,148 A | 6/1989 | Bowman |
| 4,887,754 A | 12/1989 | Boyer et al. |
| 4,934,572 A | 6/1990 | Bowman et al. |
| 4,964,287 A | 10/1990 | Gaul |
| 5,005,390 A | 4/1991 | Giannini et al. |
| 5,007,260 A | 4/1991 | Sharp |
| 5,037,019 A | 8/1991 | Sokn |
| 5,052,200 A | 10/1991 | Claar et al. |

(List continued on next page.)

OTHER PUBLICATIONS

"SARIS Upright Mount Bicycle Carrier, Model #911" Installation Instructions, Saris, A Division of Graber, 5253 Verona Road, Madison, WI 53711, 911–IS, 11/99.

"SportRack" Advertisement in Bicycle Retailer & Industry News, undated.

Photos, Saris Model #911 Upright Mount, Graber Products, Inc. 5253 Verona Road, Madison, WI 53711, undated.

Primary Examiner—Nathan J. Newhouse
(74) Attorney, Agent, or Firm—Boyle, Fredrickson, Newholm, Stein & Gratz, S.C.

(57) ABSTRACT

A fork mount or clamping assembly for securement to the prongs of a bicycle fork, such as is incorporated into a bicycle carrier. The clamping assembly includes a pair of inner clamping surfaces, and an axial skewer member extends outwardly from the inner clamping surfaces for receiving the fork prongs. A fixed front clamping member is engaged with one end of the skewer and is located outwardly of one of the inner clamping surfaces. A movable second clamping member is located outwardly of the other inner clamping surface. An adjustable position actuator arrangement is engaged with the skewer outwardly of the second outer clamping member, and is operable to selectively move the outer clamping members toward and away from each other. The actuator arrangement includes a threaded sleeve engaged with threads formed at one end of the skewer member, in combination with a pivotable cam-type actuator member which is pivotably mounted to the sleeve. The actuator member defines a cam surface that interacts with the second outer clamping member so as to selectively move the outer clamping members toward and away from each other upon pivoting movement of the actuator member. The threaded connection between the sleeve and the skewer member is located within a recess defined by the second outer clamping member, and the first outer clamping member includes an engagement tab received within a slot in the fork prong so as to prevent rotation of the skewer. In this manner, the actuator arrangement can be rotated relative to the skewer so as to adjust its axial position, to accommodate fork prongs of varying thickness. A spring is located between the sleeve and the outer clamping member, to enable the outer clamping member to act as a cam follower, and the spring functions to urge the outer clamping members away from each other.

17 Claims, 4 Drawing Sheets

U.S. PATENT DOCUMENTS

| | | |
|---|---|---|
| 5,065,921 A | 11/1991 | Mobley |
| 5,118,125 A | 6/1992 | Plunkett |
| 5,226,341 A | 7/1993 | Shores |
| 5,232,134 A | 8/1993 | Allen |
| 5,265,897 A | 11/1993 | Stephens |
| 5,275,319 A | 1/1994 | Ruana |
| 5,291,763 A | 3/1994 | Cuisinot |
| 5,362,173 A | 11/1994 | Ng |
| 5,447,362 A | 9/1995 | Nagano |
| 5,476,201 A | 12/1995 | Hall et al. |
| 5,479,836 A | 1/1996 | Chang |
| 5,511,894 A | 4/1996 | Ng |
| 5,526,661 A | 6/1996 | Lin |
| 5,526,971 A | 6/1996 | Despain |
| 5,598,959 A | 2/1997 | Lorensen et al. |
| 5,673,925 A | 10/1997 | Stewart |
| 5,699,684 A | 12/1997 | Sulin |
| 5,738,258 A | 4/1998 | Farrow et al. |
| 5,875,662 A | 3/1999 | Denby et al. |
| 5,875,947 A | 3/1999 | Noel et al. |
| 5,961,186 A | 10/1999 | Phillips |
| 6,036,069 A | 3/2000 | Sayegh |
| 6,062,450 A | 5/2000 | Noel et al. |
| 6,167,735 B1 | 1/2001 | Brown |
| 6,202,458 B1 | 3/2001 | Buchalter |
| 6,283,310 B1 | 9/2001 | Dean et al. |
| 6,494,351 B1 | 12/2002 | Dean- |

LOCKING FORK MOUNT FOR A BICYCLE CARRIER

BACKGROUND AND SUMMARY OF THE INVENTION

This invention relates to a bicycle carrier, and more particularly to a bicycle carrier having a fork mount arrangement that engages the bicycle fork so as to secure the bicycle to the carrier and maintain the stability of the bicycle on the carrier.

Fork mount bicycle carriers are well known, and employ the bicycle fork to secure the bicycle to the carrier and to stabilize the bicycle on the carrier. A conventional fork mount arrangement incorporates a skewer with which the bicycle fork is engaged. The skewer is typically received within slots in the prongs of the bicycle fork that are normally adapted to receive the axle of the bicycle wheel. The fork mount typically includes an engagement mechanism that engages the fork prongs. The engagement mechanism typically includes a nut threaded onto one end of the skewer and a cam-operated clamping member engaged with the opposite end of the skewer, which is interconnected with a manually operable handle. The clamping member and the nut cooperate to clamp the fork prongs against a fork mount block when the handle is moved to an operative or closed position. Movement of the handle to an open release position disengages the nut and the clamping member from the fork prongs, to allow the fork to be engaged with or removed from the skewer.

While a fork mount configuration provides a highly satisfactory arrangement for securing a bicycle to a carrier, certain prior art designs have nothing that prevents the bicycle from being removed from the carrier by unauthorized persons, which can result in theft of the bicycle when secured to the carrier. Attempts have been made to overcome this problem, by incorporating a lock feature into the handle which prevents the handle from being moved to its release position when locked. However, fork mount arrangements of this type still have a nut or retainer threaded onto the end of the skewer opposite the handle, which can be removed with a tool so as to allow unauthorized removal of the bicycle from the carrier. In addition, carriers of this type typically require manual manipulation of both the nut and the clamping member relative to the skewer, to adjust the clamping mechanism so as to accommodate variations in thickness of the fork prongs.

It is an object of the present invention to provide a locking fork mount arrangement for a bicycle carrier, in which there are no exposed threaded members so as to prevent disassembly of the fork mount arrangement and thereby unauthorized removal of the bicycle. It is a further object of the invention to provide such a bicycle carrier in which adjustment of the fork mount clamping mechanism is carried out using the manually operable lever that is operated so as to move the clamping mechanism between its engaged and release positions. It is a further object of the invention to provide such a bicycle carrier with a fork mount clamping mechanism having a relatively simple construction and a relatively small number of components, to minimize the cost of manufacture and simplify operation of the clamping mechanism. A still further object of the invention is to provide such a bicycle carrier having a fork mount clamping mechanism which is relatively simple in its components and construction, yet which provides effective and reliable operation in mounting a bicycle to the carrier and preventing unauthorized removal of the bicycle.

In accordance with the invention, a fork mount arrangement for a bicycle carrier includes a clamping mechanism having an elongated member, in the form of a skewer, that is adapted to be received within slots formed in the prongs of a bicycle fork. The skewer extends through a mounting block defining opposite sides, which is adapted to be received between the fork prongs and which defines a pair of spaced apart inner clamping surfaces, each of which is adapted to engage the inside of one of the fork prongs. The skewer defines first and second ends. At the first end, the skewer is provided with a first, non-rotatable clamping member that is axially fixed in position relative to the skewer, and which is spaced from a first one of the inner clamping surfaces so as to define a space for receiving one of the fork prongs therebetween. At the second end, the skewer is provided with a second clamping member that is axially movable relative to the skewer, in combination with an adjustable position actuator assembly engaged between the skewer and the second clamping member. The actuator assembly is selectively movable between an engaged position and a release position. An adjustable position connection, such as a threaded connection, is provided between the actuator assembly and the skewer for enabling the position of the actuator assembly, and thereby the clamping member, to be adjusted relative to the skewer by operation of the actuator assembly. The second clamping member is spaced outwardly from the second inner clamping surface, so as to define a space therebetween for receiving one of the fork prongs. Movement of the actuator assembly to its engaged position functions to move the second clamping member toward the second inner clamping surface, to clamp the fork prong therebetween, and to draw the first outer clamping member inwardly toward the first inner clamping surface, to clamp the opposite fork prong therebetween. A biasing member, such as a spring, is interposed between the actuator assembly and the second clamping member, for urging the second clamping member outwardly away from the second inner clamping surface into engagement with a cam surface defined by an actuator member incorporated in the actuator assembly. With this construction, movement of the actuator member to place the actuator assembly in its engaged position functions against the force of the biasing member to move the second clamping member inwardly. When the actuator member of the actuator assembly is moved to place the actuator assembly in its release position, the biasing member moves the second clamping member outwardly away from the second inner clamping surface, to enable the skewer to be moved axially so as to enable the first clamping member to be moved away from the first inner clamping surface and to disengage the fork prongs.

The first clamping member includes fork engagement structure that is received within the slot in the lower end of the fork prong located adjacent the first clamping member, which is operable to prevent rotation of the skewer when the bicycle fork is engaged with the skewer. The threaded connection between the actuator assembly and the opposite end of the skewer enables the actuator assembly to be rotated by operation of the actuator member while rotation of the skewer is prevented by engagement of the engagement structure of the first clamping member with the fork prong, to adjust the position of the second clamping member so as to accommodate fork prongs of different thicknesses. When the desired position of the second clamping member has been attained in this manner, the actuator member is operated so as to place the actuator assembly in its engaged position.

The fork mount arrangement further includes a locking arrangement for selectively maintaining the actuator assembly in its engaged position, which is operable to prevent movement of the first and second clamping members out of engagement with the fork prongs, so as to prevent unauthorized removal of the bicycle. The locking arrangement includes a lock subassembly mounted to the actuator member, in combination with a retainer associated with the second clamping member. The lock subassembly includes a key-operated outwardly extending rotatable locking tab which can be rotated between locked and unlocked positions. The lock retainer is in the form of a flange extending laterally from the second clamping member, having a slot adapted to receive the locking tab when the actuator assembly is moved to its engaged position so as to engage the fork prongs between the first and second clamping members and the respective first and second inside clamping surfaces. Movement of the locking tab to its locked position engages the locking tab with the retainer flange adjacent the slot, to prevent movement of the actuator member, to maintain the actuator assembly in its engaged position. When the actuator assembly is in its engaged position, the fork mount arrangement of the present invention has no exposed components which can be accessed and which can be manipulated to thwart the locked actuator assembly and enable removal of the bicycle from the carrier by authorized persons. Subsequent movement of the locking tab to its unlocked position allows the locking tab to be moved through the retainer slot, and thereby movement of the actuator member to place the actuator assembly in its release position, to disengage the fork prongs and to enable the bicycle to be removed from the carrier..

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
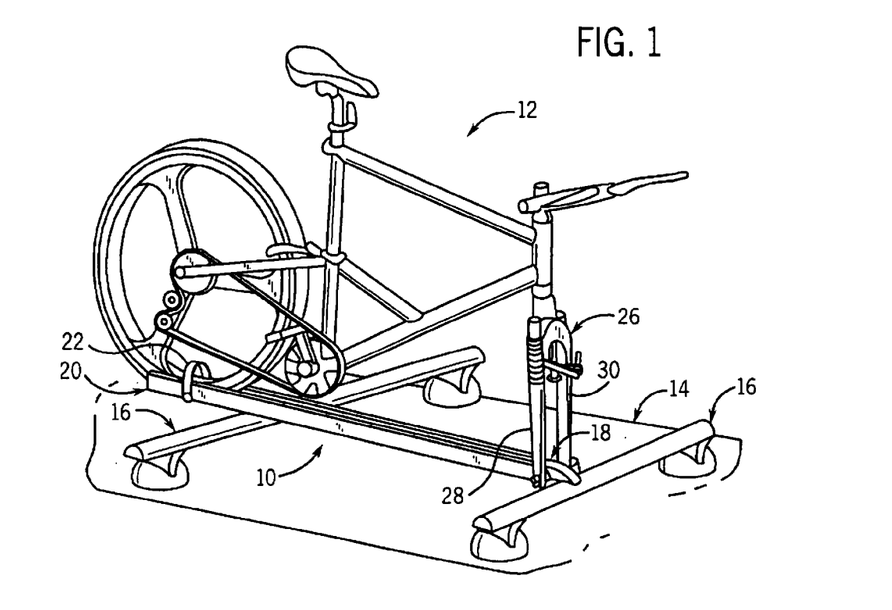
FIG. 1 is an isometric view of a bicycle carrier incorporating a locking fork mount arrangement in accordance with the present invention, for securing a bicycle to the carrier and preventing unauthorized removal of the bicycle from the carrier.
Figure 2:
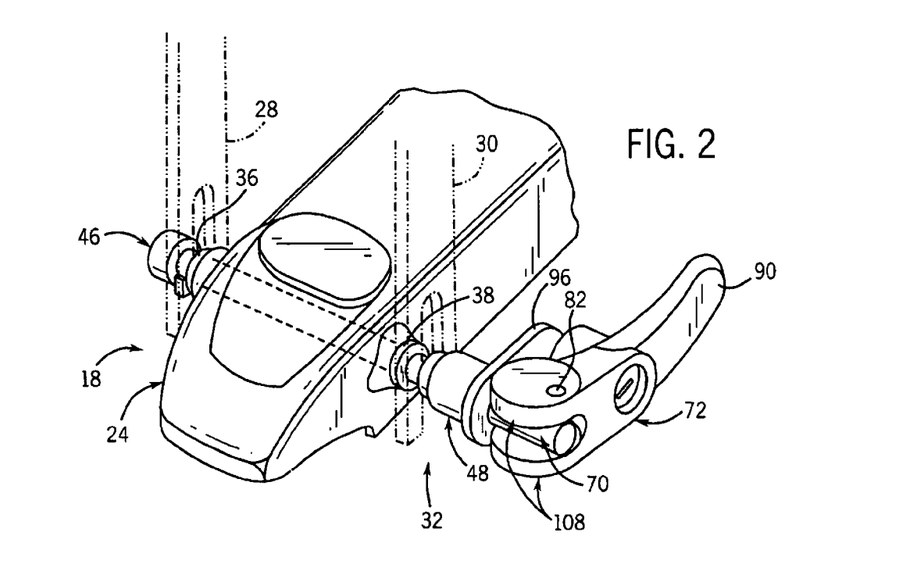
FIG. 2 is an enlarged partial isometric view of the fork mount arrangement incorporated into the bicycle carrier of FIG. 1.

Referring to FIGS. 1 and 2, a fork mount bicycle carrier in accordance with the present invention, shown generally at 10, is adapted to support a bicycle 12 on a vehicle 14. As illustrated, carrier 10 is shown mounted to the roof of vehicle 14, and is supported by a pair of transverse support members engaged with the roof of vehicle 14. Representatively, support members 16 may be of the type available from Saris, a division of Graber Products, Inc. of Madison, Wis., under its designation TALON, which includes upwardly facing T-slots with which carrier 10 is engageable for mounting carrier 10 to support members 16. It should be understood, however, that carrier 10 may also be adapted for mounting to other types of support members or to the rear of vehicle 14, via a hitch-mounted supporting structure or the like.

In the illustrated embodiment, carrier 10 includes a fork support member or block 18 engaged with one of support members 16, and a wheel support member 20 engaged with the other one of support members 16. Wheel support member 20 includes a wheel retaining arrangement, such as a strap 22, for maintaining the rear wheel of bicycle 12 in engagement with wheel support member 20. It is understood that wheel support member 20 and wheel retainer 22 are illustrative examples of numerous types of wheel support and retaining arrangements which may be incorporated in carrier 10. For example, wheel support member 20 may be a short tray-type member separate from fork support member 18 which is adapted for engagement with one of support members 16. Further, any other type of retainer arrangement may be employed for retaining the rear wheel of bicycle 12 in engagement with the wheel support member such as 20, other than the illustrated strap-type retainer.

Fork support member 18 generally includes a fork mount block or body 24 which is adapted for engagement with support member 16. Bicycle 12 includes a fork 26 having a pair of fork prongs 28, 30 which are adapted to be placed on opposite sides of body 24, and which are engaged with body 24 via a fork mount clamping assembly 32 25 constructed in accordance with the present invention.

Figures 3, 4:
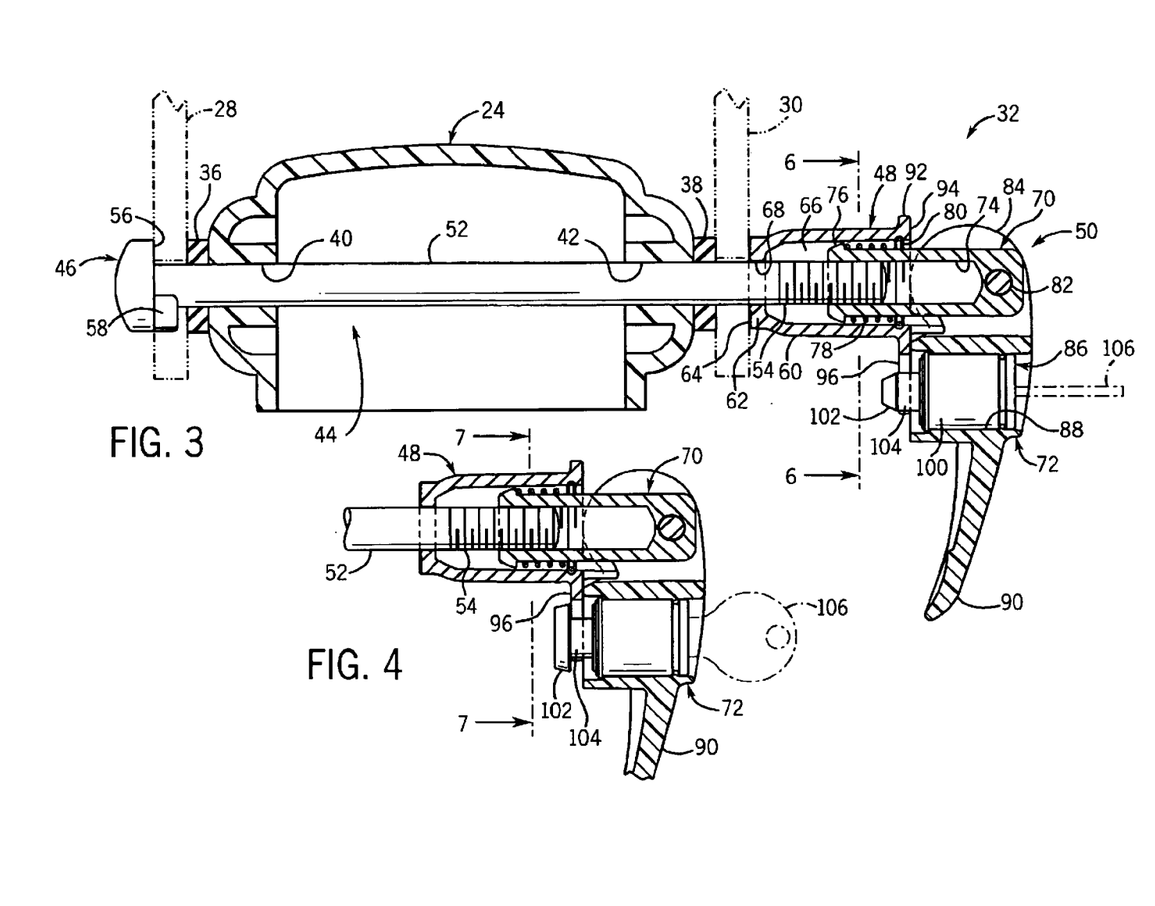
FIG. 3 is a section view through the fork mount arrangement of FIG. 1, showing the actuator assembly of the fork mount arrangement in an engaged position so as to clamp the bicycle fork prongs to the carrier.
FIG. 4 an enlarged partial section view showing the actuator assembly and movable clamping member of the fork mount arrangement of FIGS. 2 and 3.

Referring to FIGS. 2 and 3, fork mount body 24 includes a first inside clamping member 36 and a second inside clamping member 38, each of which defines an outwardly facing clamping surface. Inside clamping members 36, 38 define openings that are in alignment with respective aligned passages 40, 42 defined by fork mount body 24.

Fork mount clamping assembly 32 includes an elongated skewer member 44 having a fixed position first clamping member 46 at one end, in combination with an axially movable second clamping member 48 and an adjustable actuator assembly 50.

Skewer member 44 includes an axially extending shank 52 that extends from fixed clamping member 46. Shank 52 includes a series of threads 54 at its end opposite fixed clamping member 46.

Skewer member 44 is preferably formed such that fixed clamping member 46 and shank 52 are formed integrally with each other, such that fixed clamping member 46 is essentially in the form of a head located at one end of shank 52. It is understood, however, that fixed clamping member 46 may be formed separately from shank 52 and secured to shank 52 in any manner that prevents clamping member 46 from being removed from the end of shank 52 when fork mount clamping assembly 32 is in an operative engaged position, such that clamping member 46 cannot be manipulated to release fork mount clamping assembly 32.

Fixed clamping member 46 defines an inwardly facing clamping surface 56 which is spaced laterally from the outwardly facing clamping surface defined by inside clamping member 36. A tab 58 extends inwardly from clamping surface 56 toward clamping member 36. Tab 58 is adapted to be received within the axle-receiving slot formed in fork prong 28, to prevent rotation of skewer member 44 for reasons to be explained.

Movable clamping member 48 is generally cylindrical, including a side wall 60 and an end wall 62 having an inwardly facing clamping surface 64 that faces the outwardly facing clamping surface defined by inside clamping member 38. Side wall 60 and end wall 62 cooperate to define an internal cavity or recess 66. End wall 64 defines an opening 68 through which skewer shank 52 extends, such that skewer threads 54 are located within cavity 66.

Adjustable actuator assembly 50 includes a connector member 70 in combination with an actuator member 72. Connector member 70 defines an internally threaded passage 74 which is adapted to receive threads 54 at the end of skewer shank 52. The inner end of connector member 70 is received within cavity 66 defined by movable clamping member 48, and defines an outwardly extending end ring 76 having a peripheral outer surface located in close proximity to the internal surface of movable clamping member side wall 60. The inner end of a spring 78 engages ring 76, and the outer end of spring 78 is engaged with the inside surface of movable clamping member side wall 60 via a spring retainer 80. With this construction, spring 78 functions to apply a lateral bias to skewer shank 52 tending to urge fixed clamping member 46 and movable clamping member 48 apart from each other.

Actuator member 72 is pivotably mounted to the outer end of connector member 70 via a pivot pin 82 which defines a pivot axis oriented transverse to the longitudinal axis of skewer shank 52. Actuator member 72 includes an inner cam-shaped actuating surface 84. In addition, actuator member 72 includes a lock assembly 86 engaged within a recess 88, and a manually engageable actuator handle 90 extending outwardly from lock assembly 86.

Movable clamping member 48 includes a flange 92 which defines an outwardly facing engagement surface 94. Actuator surface 84 contacts engagement surface 94 upon pivoting movement of actuator member 72 about pivot pin 82, to selectively cause movement of movable clamping member 48 relative to skewer shank 52. Flange 92 of movable clamping member 48 includes an outward extension 96 within which a slot 98 is formed.

Lock assembly 86 includes a lock core 100 which is engaged within recess 88 so as to mount lock assembly 86 to actuator member 72. A locking tab 102 is located at the inner end of a rotatable lock shaft 104. A key 106 is engageable with lock core 100, for selectively imparting rotation to lock shaft 104 so as to selectively rotate lock tab 102 in a conventional manner.

Figure 8:
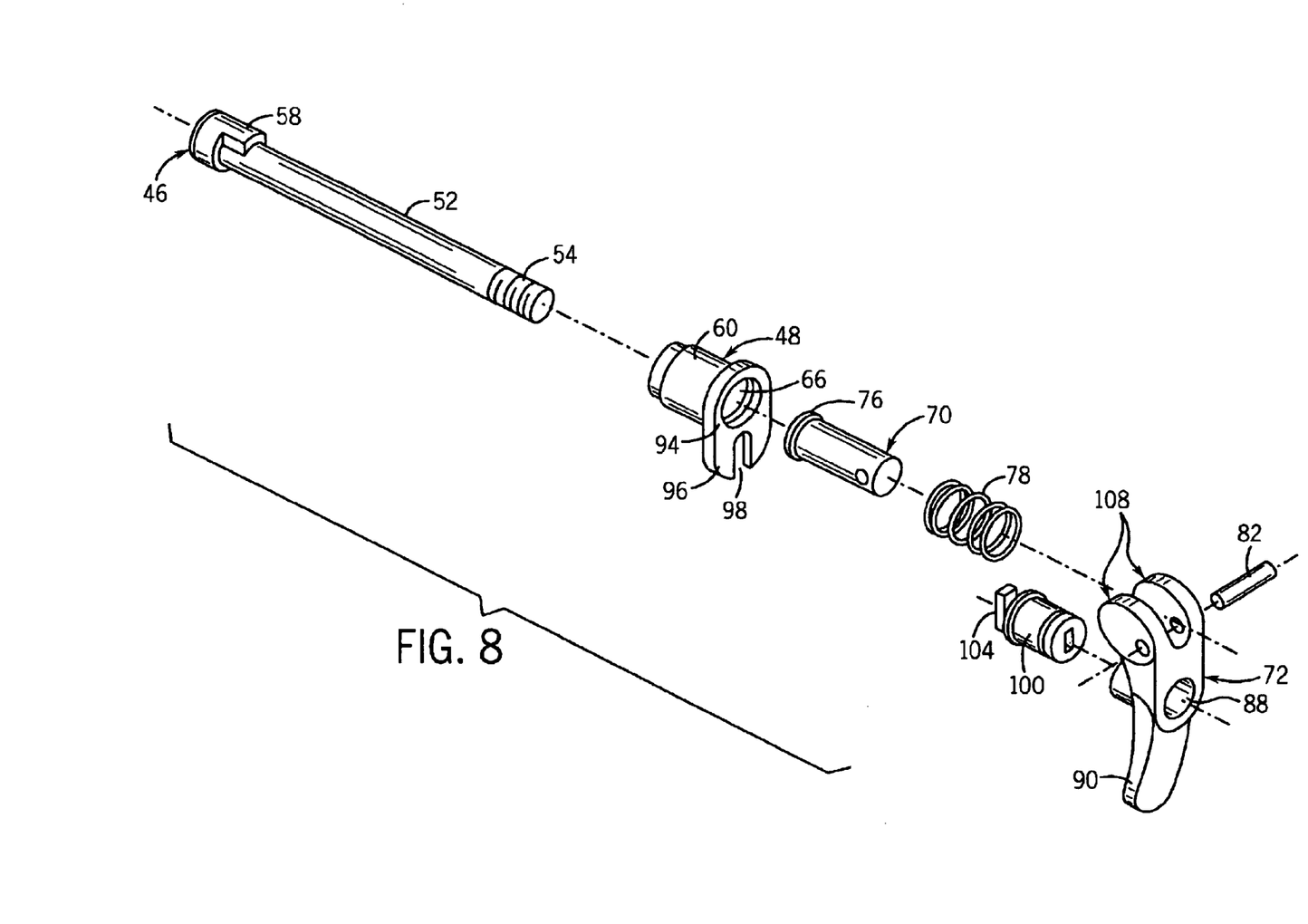
FIG. 8 is an exploded isometric view of the components of the fork mount arrangement of the present invention.

Referring to FIG. 8, cam actuator surface 84 of actuator member 72 is defined by a pair of spaced apart cam members 108, and connector member 70 is received within the space defined between cam members 108. In addition, movable clamping member 48 includes a tab 110 that extends outwardly from cam engagement surface 94, and is received within the space between cam members 108. In this manner, actuator member 72 and movable clamping member 48 rotate in unison when connector 70 is rotated on skewer shank threads 54, to maintain alignment of lock shaft 104 with locking slot 98.

In operation, fork mount clamping assembly 32 functions as follows to engage prongs 28, 30 of bicycle fork 26, to mount the forward end of bicycle 12 to fork mount carrier 10.

Figures 5, 6, 7:
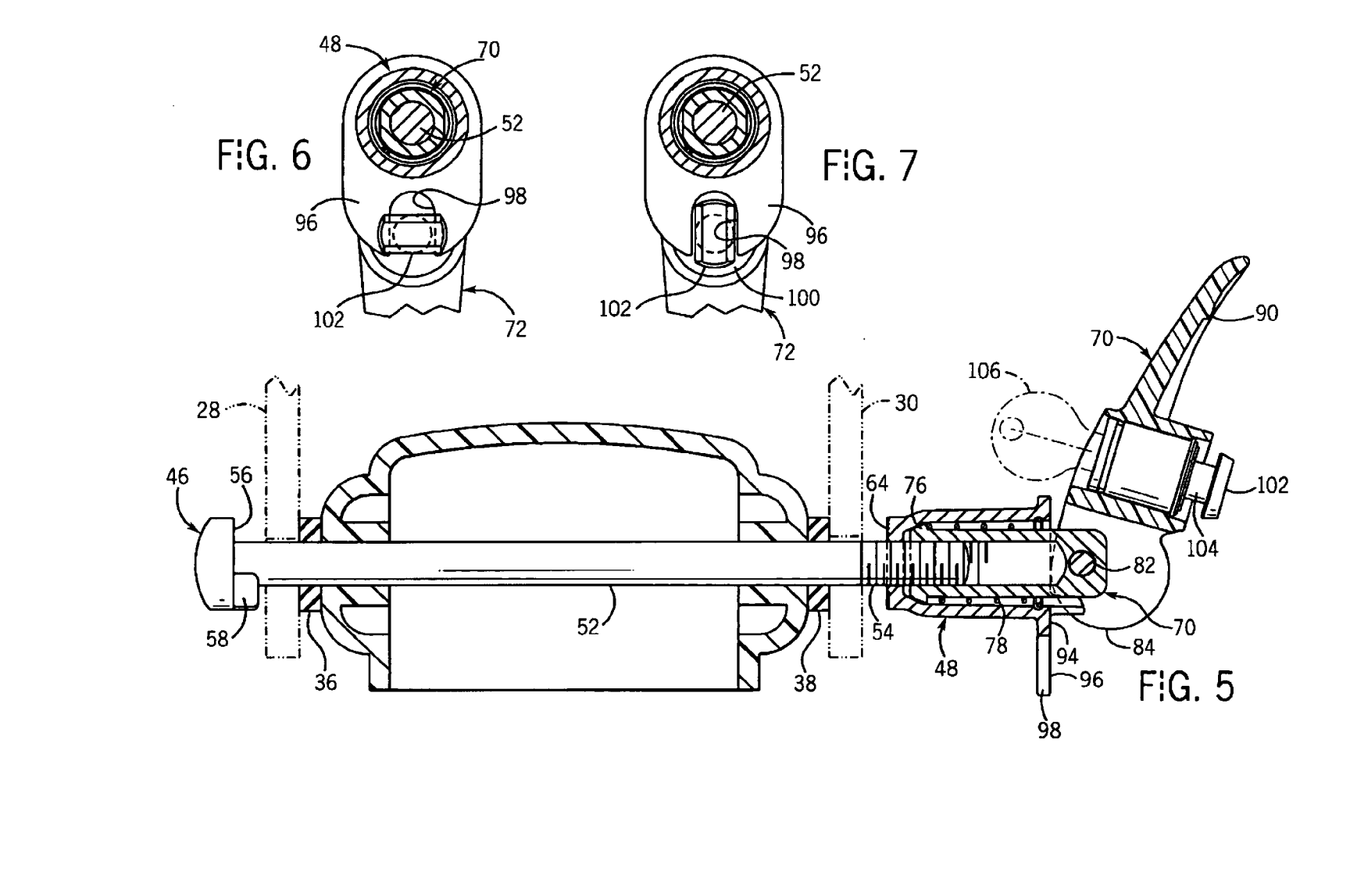
FIG. 5 is a view similar to FIG. 3, showing movement of the actuator assembly to a disengaged or release position for enabling the bicycle fork prongs to be engaged with or removed from the fork mount arrangement.
FIG. 6 is a partial section view taken along line 6—6 of FIG. 3, showing a locking member of the fork mount arrangement in a locked position so as to prevent unauthorized removal of the bicycle from the carrier.
FIG. 7 is a view similar to FIG. 6, with reference to line 7—7 of FIG. 4, showing the locking member in its unlocked position so as to allow removal of the bicycle from the carrier.

Initially, actuator assembly 50 is moved to its release position to place fork mount clamping assembly 32 in an open or receiving position as shown in FIG. 5, in which actuator member 72 is pivoted away from flange extension 96, in a counterclockwise direction. The bias of spring 78 maintains the outer engagement surface 94 of clamping member 48 in engagement with actuator surface 84, such that clamping member 48 acts as a cam follower. When actuator member 72 is pivoted to its release position in this manner, spring 78 functions to move connector 70 laterally within cavity 66, to draw the outer end of connector member 70 inwardly in order to maintain engagement between cam actuator surface 84 and engagement surface 94 of movable clamping member 48. Such movement of connector member 70 functions to move fixed clamping member 46 in an outward position relative to inside clamping member 36. Actuator assembly 50 is then manually manipulated so as to position skewer shank 52 within body 24 so as to provide a sufficient space between fixed clamping member 46 and inside clamping member 36 to receive fork prong 28, and to provide a sufficient space between movable clamping member 48 and inside clamping member 38 sufficiently to receive fork prong 30. Fork prongs 28, 30 are then engaged with skewer shank 52 as shown in FIG. 5, such that skewer shank 52 is received within the downwardly facing slots in prongs 28, 30 that are normally adapted to receive the axle of the bicycle wheel. The user then rotates actuator assembly 50 or skewer 44, to align tab 58 with the slot in fork prong 28. The user then applies an axial force on actuator assembly 50 or skewer 44 so as to move tab 58 into engagement within the slot in fork prong 28, such that further rotation of skewer member 44 is prevented. Adjustable actuator assembly 50 is then rotated on threads 54 formed at the end of skewer shank 52 so that actuator assembly 50 is in a desired axial position on skewer shank 52. The user then manually pivots actuator member 72 to its engaged position as shown in FIGS. 3 and 4, to place fork mount clamping assembly 32 in a closed or operative position. During such movement of actuator member 72, cam actuator surface 84 interacts with engagement surface 94 of movable clamping member 48 so as to draw connector member 70 outwardly from its FIG. 5 position to its FIG. 3 position, against the force of spring 78. This functions to move skewer member 44 laterally rightwardly, and to draw fixed clamping member 46 toward movable clamping member 48. When fork mount clamping assembly 32 is in its closed or operative position of FIG. 3, fork prong 28 is clamped between the outwardly facing clamping surface of inside clamping member 36 and inwardly facing clamping surface 56 of fixed clamping member 46. Fork prong 30 is clamped between the outwardly facing clamping surface of inside clamping member 38 and inwardly facing clamping surface 64 of movable clamping member 48. This functions to fix the lower end of fork 26 to body 24, to secure bicycle 12 to carrier 10 and to provide stability to bicycle 12.

When fork mount clamping assembly 32 is in its closed or operative position of FIG. 3, the user is able to prevent unauthorized operation of clamping assembly 32 by employing key 106 to rotate lock shaft 104 such that locking tab 102 is rotated 90° to its FIG. 6 position. In this position, locking tab 102 is out of alignment with slot 98, such that actuator member 72 cannot be rotated away from its engaged position as illustrated. Furthermore, when clamping assembly 32 is locked in this manner, the components of clamping assembly 32 cannot be manipulated so as to allow disassembly or removal, to provide a secure anti-theft feature for carrier 10 that prevents removal of bicycle 12.

To release engagement with bicycle fork prongs 28, 30, the user employs key 106 to return locking tab 102 to its unlocked position in alignment with slot 98 as shown in FIGS. 4 and 7, and actuator member 72 is then rotated to its release or disengaged position of FIG. 5, to release the clamping forces applied to fork prongs 28, 30 and to allow disengagement of bicycle fork 28 from fork support member 18.

The threaded engagement of actuator assembly 50 with the end of skewer member 44 provides a quick and easy adjustment feature for accommodating different thicknesses of fork prongs 28, 30. Adjustment is carried out simply by rotating actuator member 72, along with movable clamping member 48, on skewer member threads 54. Engagement of tab 58 within the slot of fork prong 28 prevents skewer shank 52 from rotating during rotation of actuator member 72. At any time during adjustment, the user simply moves actuator member 72 toward its engaged position to determine whether the desired degree of adjustment has been attained. Adjustment can be carried out when actuator member 72 is in its full release position of FIG. 5, or when actuator member 72 in any position away from its engaged position of FIG. 3.

While the invention has been shown and described with respect to a specific embodiment, it is contemplated that numerous variations are contemplated as being within the scope of the present invention. For example, and without limitation, fork mount clamping assembly 32 may be utilized in any fork mount carrier application, such as in a hitch-mounted rack as noted previously, or in a truck bed rack or a rack adapted to be received within the interior of a vehicle. In addition, while fork mount clamping assembly 32 has been illustrated in connection with a bicycle carrier, it is also contemplated that fork mount clamping assembly 32 may be utilized to mount a bicycle wheel to a bicycle fork so as to prevent unauthorized removal of the bicycle wheel. In an embodiment such as this, skewer member 44 functions as a wheel axle, and conventional bearings are engaged between the wheel and axle for enabling the wheel to rotate relative to the axle.

Further, while a threaded connection between skewer member 44 and actuator assembly 50 has been illustrated, it is understood that any other type of connection which provides adjustment in the axial position of one member relative to another may be employed, e.g. a ratchet-type connection or the like. Further, while fixed clamping member 46 is illustrated as being formed integrally with the end of skewer shank 52, it is also contemplated that a threaded or other connection may be employed between fixed clamping member 46 and skewer shank 52 since, when clamping assembly 32 is in its closed position of FIG. 3, it is not possible to rotate fixed clamping member 46 when engaged within the slot of fork prong 28, which otherwise could result in the ability to disassembly clamping assembly 32.

With the construction of clamping assembly 32 as shown and described, the user is able to adjust and actuate clamping assembly 32 from one side of fork support member 18. Clamping assembly 32 can be adjusted and actuated with one hand, which facilitates operation especially in a roof-mount application in which two-handed operation is difficult. Further, clamping assembly 32 provides a simple and reliable locking fork mount assembly which cannot be disassembled when in the closed position, to provide an anti-theft feature which has not been possible with prior art designs.

Various alternatives and embodiments are contemplated as being within the scope of the following claims particularly pointing out and distinctly claiming the subject matter regarded as the invention.

I claim:

1. A clamping assembly for a fork having a pair of fork prongs, comprising:

a pair of inner clamping surfaces;

an elongated skewer member extending between the inner clamping surfaces and outwardly from each inner clamping surface, wherein the skewer member includes a threaded section;

a fixed position first outer clamping member engaged with the skewer member and located outwardly of a first one of the inner clamping surfaces, wherein the threaded section of the skewer member is located outwardly of a second one of the inner clamping surfaces;

an axially movable second outer clamping member located outwardly of a second one of the inner clamping surfaces; and an actuator arrangement operable on the second outer clamping member so as to selectively move the first and second outer clamping members together to an operative position in which one of the fork prongs is clamped between the first outer clamping member and the first inner clamping surface, and a second one of the fork prongs is clamped between the second outer clamping member and the second inner clamping surface, and to an inoperative position in which the first and second fork prongs are released from engagement between the first and second outer clamping members and the respective first and second inner clamping surfaces;

wherein the actuator arrangement includes a connector member threadedly engaged with the threaded section of the skewer member, and an actuator member mounted to the connector member, wherein operation of the actuator member moves the second outer clamping member between the operative and inoperative positions, and wherein rotation of the connector member and the actuator member is operable to adjust the axial position of the connector member, and thereby the actuator member, relative to the fixed position first outer clamping member.

2. The clamping assembly of claim 1, wherein the clamping assembly forms a part of a bicycle carrier and wherein the first and second inner clamping surfaces are defined by a fork mount section of the bicycle carrier.

3. The clamping assembly of claim 2, wherein the actuator arrangement comprises a cam-type actuator member pivotably mounted to the connector member for movement about a pivot axis extending substantially transverse to a longitudinal axis defined by the skewer member and the connector member.

4. The clamping assembly of claim 3, further comprising a lock arrangement interposed between the second outer clamping member and the cam-type actuator member for selectively maintaining the actuator member in an engaged position in which the clamping members are placed in the operative position.

5. The clamping assembly of claim 2, wherein the first outer clamping member includes engagement structure adapted to be received within a slot defined by a first one of the fork prongs when the fork prongs are engaged with the skewer member, for preventing rotation of the skewer member.

6. A clamping assembly for a bicycle carrier for carrying a bicycle having a fork defining a pair of fork prongs, comprising:
- a fork mount section having first and second inner clamping surfaces;
- an elongated skewer member extending between the inner clamping surfaces and outwardly from each inner clamping surface;
- a fixed position first outer clamping member engaged with the skewer member and located outwardly of the first inner clamping surface;
- an axially movable second outer clamping member interconnected with the skewer member and located outwardly of the second inner clamping surface;
- a connector member extending outwardly from the skewer member;
- wherein the second outer clamping member is interconnected with the skewer member via mating threads provided on the skewer member and on the connector member; and
- an actuator arrangement engaged with the connector member and operable on the second outer clamping member so as to selectively move the first and second outer clamping members together to an operative position in which a first one of the fork prongs is clamped between the first outer clamping member and the first inner clamping surface, and a second one of the fork prongs is clamped between the second outer clamping member and the second inner clamping surface, and to an inoperative position in which the first and second fork prongs are released from engagement between the first and second outer clamping members and the respective first and second inner clamping surfaces;
- wherein the actuator arrangement comprises a cam-type actuator member pivotably mounted to the connector member for movement about a pivot axis extending substantially transverse to a longitudinal axis defined by the skewer member and the connector member; and
- wherein the connector member and the second outer clamping member are axially movable relative to each other, and further comprising a biasing member interposed between the connector member and the second outer clamping member for urging the second outer clamping member into engagement with a cam surface defined by the cam-type actuator member.

7. The clamping assembly of claim 6, wherein the second outer clamping member defines an internal cavity which receives an inner portion of the connector member, wherein the biasing member is disposed within the internal cavity and bears between the second outer clamping member and the inner portion of the connector member, and wherein the cam-type actuator member is pivotably mounted to an outer portion of the connector member located outwardly of the internal cavity defined by the second outer clamping member.

8. A clamping assembly for a fork having a pair of fork prongs, comprising:
- a pair of inner clamping surfaces;
- an elongated skewer member extending between the inner clamping surfaces and outwardly from each of the inner clamping surfaces, wherein the elongated skewer member includes a threaded section;
- a first outer clamping member engaged with the skewer member and located outwardly of a first one of the inner clamping surfaces;
- a second outer clamping member interconnected with the skewer member and located outwardly of a second one of the inner clamping surfaces; and
- an adjustable actuator arrangement interconnected with the skewer member, wherein the adjustable actuator arrangement includes a threaded connector engaged with the threaded section of the elongated skewer member, and an actuator member movably mounted to the threaded connector, wherein rotation of the threaded connector and the actuator provides axial adjustment of the actuator arrangement relative to the skewer member, wherein movement of the actuator member is operable to selectively move the first and second outer c together and apart so as to selectively clamp the fork prongs between the inner clamping surfaces and the first and second outer clamping members;
- wherein the first outer clamping member includes engagement structure which is adapted to be received within a slot defined by one of the fork prongs so as to prevent rotation of the skewer member and to allow rotation of the actuator arrangement relative to the skewer member so as to adjust the axial position of the actuator arrangement relative to the skewer member.

9. The clamping assembly of claim 10, wherein the second outer clamping member defines an inwardly facing clamping surface, and wherein the engagement structure comprises a tab member extending inwardly from the inwardly facing clamping surface toward the first inner clamping surface.

10. The clamping assembly of claim 8, wherein the threaded connector comprises a sleeve member engaged with the threaded section of the skewer member, and wherein the actuator member is pivotably interconnected with the sleeve member via a pivot connection, wherein the actuator member includes cam structure operable on the second outer clamping member so as to selectively move the first and second outer clamping members together and apart upon pivoting movement of the actuator member.

11. The clamping assembly of claim 10, wherein the second outer clamping member defines a cavity within which the threaded section of the skewer member is received, wherein the sleeve member extends into the cavity for engagement with the threaded section of the skewer member, and wherein the actuator member is pivotably interconnected with an outer portion of the sleeve member located outwardly of the internal cavity defined by the second outer clamping member.

12. A clamping assembly for a fork having a pair of fork prongs, comprising:
- a pair of inner clamping surfaces;
- an elongated skewer member extending between the inner clamping surfaces and outwardly from each of the inner clamping surfaces;
- a first outer clamping member engaged with the skewer member and located outwardly of a first one of the inner clamping surfaces;
- a second outer clamping member interconnected with the skewer member and located outwardly of a second one of the inner clamping surfaces, wherein the second outer clamping member defines a cavity; and an adjustable actuator arrangement interconnected with the skewer member via a threaded connection for enabling axial adjustment of the actuator arrangement relative to the skewer member, wherein the actuator arrangement is operable to selectively move the first and second outer clamping members together and apart so as to selectively clamp the fork prongs between the inner clamping surfaces and the first and second outer clamping members, wherein the actuator arrangement comprises a threaded sleeve member engaged with a threaded portion of the skewer member, in combination with an actuator member pivotably interconnected with the sleeve member via a pivot connection, wherein the actuator member includes cam structure operable on the second outer clamping member so as to selectively move the first and second outer clamping members together and apart upon pivoting movement of the actuator member;

wherein the threaded portion of the skewer member is received within the cavity defined by the second outer clamping member, and wherein the sleeve member extends into the cavity for engagement with the threaded portion of the skewer member, and wherein the actuator member is pivotably interconnected with an outer portion of the sleeve member located outwardly of the cavity defined by the second outer clamping member;

wherein the first outer clamping member includes engagement structure which is adapted to be received within a slot defined by one of the fork prongs so as to prevent rotation of the skewer member and to allow rotation of the actuator arrangement relative to the skewer member so as to adjust the axial position of the actuator arrangement relative to the skewer member; and a spring located within the cavity defined by the second outer clamping member and interposed between the second outer clamping member and the inner portion of the sleeve member, for biasing the sleeve member into the cavity and thereby biasing the first and second outer clamping members apart from each other.

13. A clamping assembly for a fork having a pair of fork prongs, comprising:

a pair of inner clamping surfaces;

an elongated skewer member extending between the inner clamping surfaces and outwardly from each of the inner clamping surfaces, wherein the elongated skewer member includes a threaded section;

a first outer clamping member interconnected with the skewer member and located outwardly of a first one of the inner clamping surfaces;

a second outer clamping member interconnected with the skewer member and located outwardly of a second one of the inner clamping surfaces; and an adjustable position actuator arrangement interconnected with the skewer member, including an internal engagement arrangement interposed between the actuator arrangement and the skewer member, and wherein the actuator arrangement includes a movable actuator member which is operable to selectively move the first and second outer clamping members toward and away from each other;

wherein the internal engagement arrangement includes a threaded connector member engaged with the threaded section of the skewer member, wherein the actuator member is carried by the threaded connector member and wherein rotation of the threaded connector member and the actuator member is operable to adjust the position of the connector member, and thereby the actuator member, relative to the skewer member.

14. The clamping assembly of claim 13, wherein at least a portion of the connector member is located within a cavity defined by the second outer clamping member. is located within a cavity defined by the second outer clamping member.

15. The clamping assembly of claim 14, wherein the connector member defines an inner portion located within the cavity of the second outer clamping member, in combination with an outer portion extending outwardly therefrom, wherein the actuator member is pivotably interconnected with the outer portion of the connector member.

16. The clamping assembly of claim 15, wherein the connector member is received within a space defined between a pair of cam members forming a part of the actuator member, wherein the actuator member is pivotable about a pivot axis defined by a pivot pin extending between the cam members and through a passage defined by the outer portion of the connector member.

17. A clamping assembly for a fork having a pair of fork prongs, comprising:

a pair of inner clamping surfaces;

an elongated skewer member extending between the inner clamping surfaces and outwardly from each of the inner clamping surfaces;

a first outer clamping member interconnected with the skewer member and located outwardly of a first one of the inner clamping surfaces;

a second outer clamping member interconnected with the skewer member and located outwardly of a second one of the inner clamping surfaces; and an adjustable position actuator arrangement interconnected with the skewer member, including an internal engagement arrangement interposed between the actuator arrangement and the skewer member, and wherein the actuator arrangement includes a movable actuator member which is operable to selectively move the first and second outer clamping members toward and away from each other, wherein the actuator arrangement includes a connector member engaged with the skewer member via an adjustable position connection arrangement which is located within a cavity defined by the second outer clamping member, wherein the adjustable position connection arrangement comprises threaded engagement structure between the connector member and the skewer member so as to enable the actuator arrangement to be axially moved relative to the skewer member by rotation of the actuator arrangement relative to the skewer member;

wherein the connector member defines an inner portion located within the internal cavity of the second outer clamping member, in combination with an outer portion extending outwardly therefrom, wherein the actuator member is pivotably interconnected with the outer portion of the connector member; and a biasing member interposed between the second outer clamping member and the inner portion of the connector member for urging the connector member inwardly toward the internal cavity of the second outer clamping member, and thereby urging the first outer clamping member away from the second outer clamping member by urging axial movement of the skewer member relative to the second outer clamping member.

* * * * *

UNITED STATES PATENT AND TRADEMARK OFFICE
CERTIFICATE OF CORRECTION

PATENT NO. : 6,758,380 B1
DATED : July 6, 2004
INVENTOR(S) : Clint D. Kolda

It is certified that error appears in the above-identified patent and that said Letters Patent is hereby corrected as shown below:

Column 10,
Line 19, after "outer", delete "c" and insert -- clamping mechanism --;
Line 30, delete "10" and substitute therefor -- 8 --;

Column 12,
Line 6, after "member." delete "is located within a cavity defined by the second outer clamping member."

Signed and Sealed this

Ninth Day of November, 2004

JON W. DUDAS
*Director of the United States Patent and Trademark Office*